July 26, 1938.　　　R. V. NORRIS ET AL　　　2,124,952
FISH NET
Filed July 29, 1935
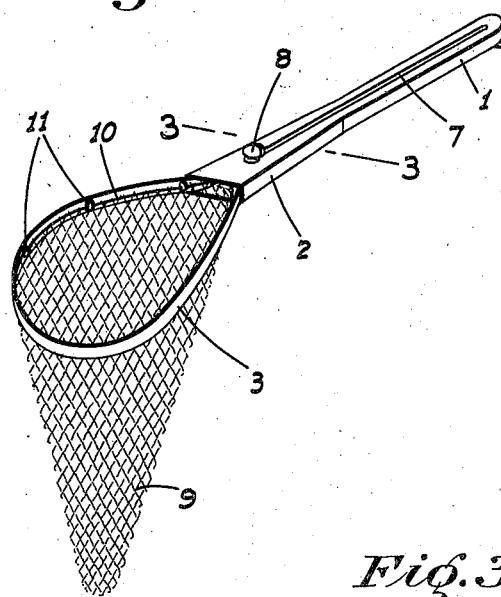
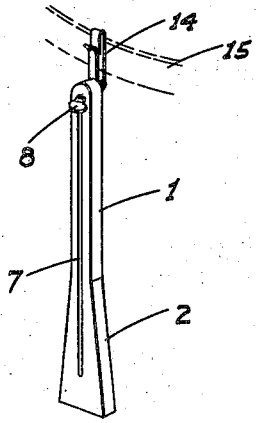
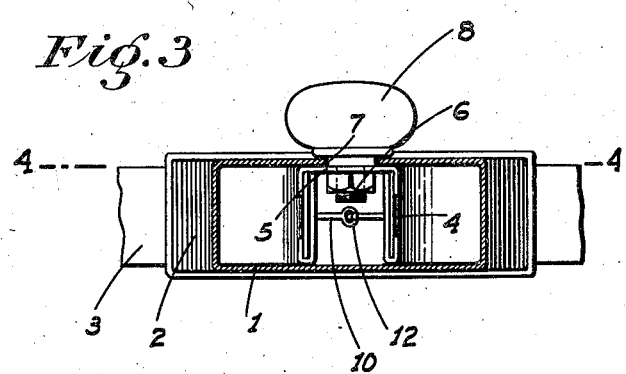
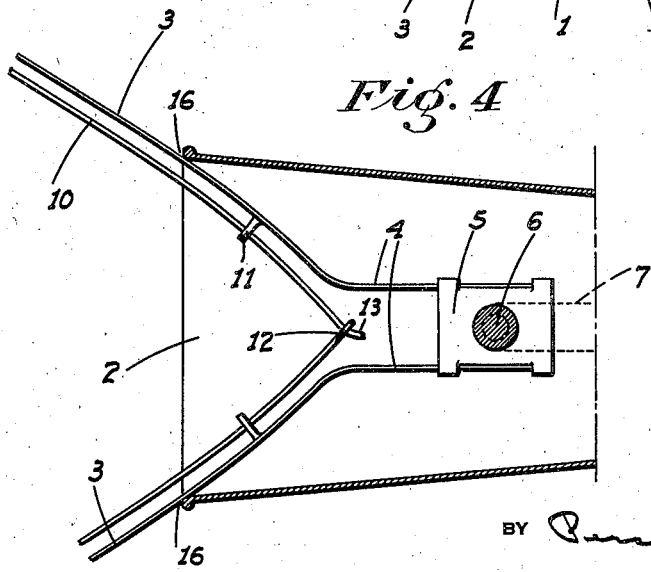
INVENTORS
R. V. Norris
O. G. Avery
BY
ATTORNEY Patented July 26, 1938

2,124,952

UNITED STATES PATENT OFFICE 2,124,952

FISH NET

Rolla V. Norris and Omer G. Avery, Porterville, Calif.

Application July 29, 1935, Serial No. 33,670

1 Claim. (Cl. 43—12)

This invention relates generally to a fish net, and is directed particularly and specifically to a fish landing net of that character used by fishermen to land a fish which has been taken on a rod and line.

The principal object of our invention is to provide a fish landing net which includes a collapsible frame which when the net is not in use may be collapsed and contained along with the net proper within a relatively small combination case and handle.

As further objects of our invention it is our purpose to provide means whereby the collapsed frame and the net may be rapidly projected from one end of the combination handle and case and at once automatically positioned ready for use; and to provide means for the easy removal of the net from the frame for repair or replacement.

A further object of the invention is to produce a simple and inexpensive device and yet one which will be exceedingly effective for the purpose for which it is designed.

These objects we accomplish by means of such structure and relative arrangement of parts as will fully appear by a perusal of the following specification and claim.

In the drawing similar characters of reference indicate corresponding parts in the several views:

Figure 1 is a perspective view of our improved landing net in extended position and ready for use.

Figure 2 is a perspective view of the landing net in its contracted or carrying position as suspended from a fisherman's belt.

Figure 3 is a transverse sectional view taken on the line 3—3 of Figure 1.

Figure 4 is a sectional plan view taken on the line 4—4 of Figure 3.

Referring now more particularly to the characters of reference on the drawing, the numeral 1 denotes a hollow metallic case rectangular in cross section which also serves as a handle for the device. This case 1 is of the same depth throughout its length but increases in width toward one end to form a flaring portion 2, the case being open at this flaring end.

A net supporting frame 3 is formed from a flexible and resilient metal band and the ends thereof are brought relatively close together and parallel to each other within the case as at 4. These adjacent ends of the frame are rigidly secured to a supporting member 5 which is slidable and guided within the case by means of a pin 6 which is secured to the member 5 and projects through a longitudinal slot 7 in the case 1 to a termination in an enlarged thumb plate 8 exteriorly and transversely of the case.

A conventional cord net 9 is suspended from the frame 3 and is secured thereto by a resilient wire 10 which is threaded through the upper loops of the net and also slidably projects through spaced eyes 11 on the inner side of the frame. One end of this wire is formed with an eye 12 through which the other end 13 of the wire slidably and removably projects.

A spring clip 14 is used to suspend the landing net from the belt 15 of the fisherman when the net is not in use, as illustrated in Figure 2; the clip being supported from a transverse loop on the closed end of the handle as indicated in Fig. 2.

Operation

When our improved landing net is not in use the collapsed frame as well as the cord net are contained within the case 1, as illustrated in Figure 2, and the device suspended if desired from the fisherman's belt by means of the spring clip 14.

When it is desired to use the landing net, which is suspended from the fisherman's belt, the thumb plate is pushed down toward the flaring end of the case and as the resilient frame is projected from the open end of the case it will begin to expand and assume an open position. After a portion of this frame has been projected from the case the force exerted by this portion of the frame expanding will draw the remainder of the frame out of the case and then the tension of the entire frame will hold the same in rigid position for use due to the fact that the frame cannot completely expand, being limited by engagement with the case as at 16. The flaring end of the case prevents undue bending of the outer end of the frame when the frame is collapsed and drawn into the case. This flaring portion of the case also facilitates projection of the frame therefrom. After the net has assumed an open position, the case is unsnapped from the belt clip and the net used to land the fish.

To collapse the frame and draw it into the case the thumb plate is moved toward the clip end of the case. When substantially all of the frame has been drawn into the case the cord net is then folded between the remaining portion of the frame and both frame and net are completely drawn into the case. With the bending or collapsing of the frame the wire 10, being resilient and slidable through the eyes 11, collapses also and is carried with the frame into the case.

This novel landing net is not only compact and convenient to carry but is also not subject to the objectionable feature of an ordinary non-collapsible fish landing net—namely, the fact that when not in use the cord net often catches on brush, twigs or the like and is torn.

In our improved landing net if it is desired to remove the net for repair or replacement it is only necessary to remove the pin 6 and take the frame 3 completely out of the case. The end 13 of the wire 10 may then be disconnected from the eye 12 and the entire wire drawn out of the spaced eyes 11, thereby permitting removal of the net from the frame.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described our invention, what we claim as new and useful and desire to secure by Letters Patent is:

A fish landing net comprising a hollow handle, a collapsible frame projecting from one end of the handle and comprising a resilient flexible metal band having its ends adjacent but spaced from each other and projecting into the handle, a net for the frame, means to collapse and withdraw the frame into the handle, and means removably securing the net on the frame and comprising a plurality of eyes spaced about the band on the inside thereof, a resilient flexible wire one end of which may be removably threaded through the upper loops of the net and slidably projected through the eyes; the other end of the wire being formed with an eye through which said one end of the wire slidably and removably projects; said ends of the wire being disposed outwardly of the net and between the end portions of the band adjacent the handle, whereby the wire may collapse with the frame and be drawn into the handle with said frame.

ROLLA V. NORRIS.
OMER G. AVERY.